United States Patent [19]

Perreault

[11] 4,106,103

[45] Aug. 8, 1978

[54] DERIVATION OF DISCRETE FOURIER TRANSFORM COMPONENTS OF A TIME DEPENDENT SIGNAL

[75] Inventor: Donald A. Perreault, Thousand Oaks, Calif.

[73] Assignee: Xerox Corporation, Stamford, Conn.

[21] Appl. No.: 706,702

[22] Filed: Jul. 19, 1976

[51] Int. Cl.² .............................................. G06F 7/38
[52] U.S. Cl. ................................... 364/827; 364/726; 364/825
[58] Field of Search ................ 333/18, 70 T; 328/155, 328/167; 235/152, 156, 193; 325/42

[56] References Cited

U.S. PATENT DOCUMENTS

| | | | |
|---|---|---|---|
| 3,581,078 | 5/1971 | Robertson | 235/193 |
| 3,714,566 | 1/1973 | Kang | 235/156 X |
| 3,778,606 | 12/1973 | Schmitt et al. | 235/156 |
| 3,803,395 | 4/1974 | Quate | 235/193 |
| 3,851,162 | 11/1974 | Munoz | 235/156 |
| 3,864,632 | 2/1975 | Chang | 333/18 X |
| 3,987,292 | 10/1976 | Means | 235/193 X |

OTHER PUBLICATIONS

Oppenheim, *Speech Spectrograms Using the Fast Fourier Transform*, IEEE Spectrum, 8/70, pp. 57-62.

*Primary Examiner*—Paul L. Gensler

[57] ABSTRACT

An automatic equalizer for calculating the equalization transfer function and applying same to equalize received signals. The initial calculation as well as the equalization proper are conducted entirely within the frequency domain. Overlapping moving window samplings are employed together with the discrete Fourier transformation and a sparse inverse discrete Fourier transformation to provide the equalized time domain output signals.

20 Claims, 20 Drawing Figures

DERIVATION OF DISCRETE FOURIER TRANSFORM COMPONENTS OF A TIME DEPENDENT SIGNAL

BACKGROUND OF THE INVENTION

The invention pertains to frequency-domain automatic equalization for electrical signals used in transmission of information.

Ideally, it is desirable to transmit electrical signals such that no interference occurs between successive symbols. In practice, however, transmission channels are bandlimited and intersymbol interference is controlled utilizing clocked systems with equalization conventionally performed in the time domain.

Most conventional automatic equalizers operate in a feedback mode so that the effects of changes in the equalizer transfer function are monitored and used to produce further changes in the transfer function to obtain the best output signals. In such systems, the measurements of the output signal are made in the time domain. Typically, the transfer function may be constructed in the time domain by adjusting the tap gains of a tapped delay line during an initial training period prior to actual message transmission. Examples of such systems are shown in U.S. Pat. Nos. 3,375,473 and 3,292,110.

Frequency domain equalization utilizing time domain adjustments are shown, for example, in the U.S. Pat. No. 3,614,673 issued to George Su Kang. Kang utilizes frequency domain measurement and calculations to produce the time domain impulse response of a transversal filter. The impulse response of the transversal filter is applied to set the weights of the transversal filter.

CROSS REFERENCE TO RELATED APPLICATION

A related and commonly assigned U.S. patent application has been concurrently filed under Ser. No. 706,703 for "Frequency Domain Automatic Equalizer Utilizing the Discrete Fourier Transform."

SUMMARY OF THE INVENTION

The principal object of the invention is to provide an automatic equalizer, operable completely in the frequency domain, to provide both frequency domain measurements of the transmitted signal and frequency domain corrections to equalize channel amplitude and phase distortion.

A significant feature of the invention is in the utilization of sliding window samplings of the input waveform to provide a plurality of sample sets each time displaced from successive sets by an amount T/N, where T is the sample set window or time frame and N is the number of samples within a sample set of the input waveform. Each sample set forms a discrete data set which is transformed by an analog discrete Fourier transform (ADFT) into the frequency domain. The spectral coefficients are corrected in the frequency domain employing component-by-component multiplication using previously calculated correction coefficients computed during an initial training period where ideal or test pulses are transmitted. The corrected spectral coefficients are inverse transformed using an analog inverse discrete Fourier transform (AIDFT) to provide an output value corresponding to one sample within the input waveform sample set. The frequency domain corrected spectral coefficients are computed for each window such that the sliding window sampling produces a new output value of the AIDFT N times during the sample period T.

Another significant feature of the invention is in the utilization of time shared multiplying circuits to achieve both the correction factor measurements and subsequent frequency domain adjustment or equalization.

Another object of the invention is to provide a method and apparatus for continuously generating the DFT coefficients from overlapping sliding window sample sets of the incoming signal.

Yet another object of the invention is to provide a method and apparatus for producing the effect of an aperiodic convolution of the incoming signal sample sets with the impulse response of an equalizer wherein an overlapping sliding window sampling is utilized in conjunction with a sparse inverse DFT apparatus providing a single time domain output for each incoming sample set.

BRIEF DESCRIPTION OF THE DRAWINGS

These and other features and advantages of the invention will become apparent when taken in conjunction with the following specification and drawings wherein.

DETAILED DESCRIPTION OF THE ILLUSTRATIVE EMBODIMENT

Figure 1:
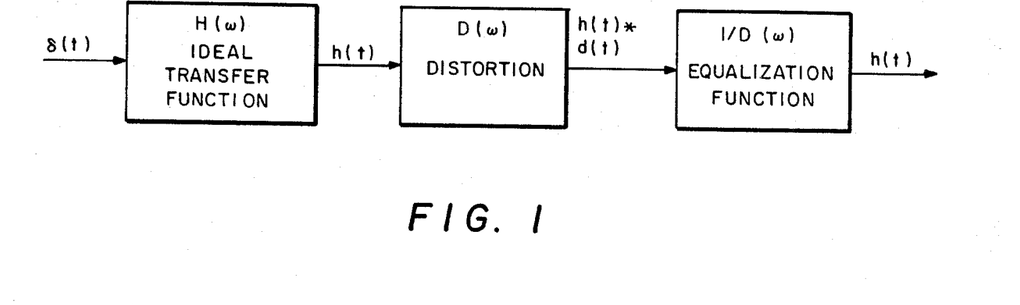
FIG. 1 is a block diagram of the overall theoretical model used in the instant invention.

A block diagram of the model of the transmission system is shown in FIG. 1. The system is assumed linear and it is therefore theoretically immaterial where in the system the distorting elements are located. The transfer function H(w) is a composite of all the ideal elements of the system and is shown in cascade with D(w), which is a composite of all the linear distorting elements of the system. It is assumed that the impulse response $h(t)$ is the ideal symbol and that the information is represented by the magnitude and/or polarity of impulses at the input to H(w) which impulses are spaced in time according to the requirements of $h(t)$ and the detection process. The output of the system is the Fourier transform of H(w) × D(w), or the convolution of H(t) and d(t), and is no longer ideal. The equalizer is connected in cascade with the distortion network and functions to eliminate the effects of D(w), i.e., the transfer function of the equalizer is 1/D(W). The equalizer precedes the decision point at the receiver, and the system is capable of determining D(w) and then producing the transfer function 1/D(w) in the transmission path.

Figure 2:
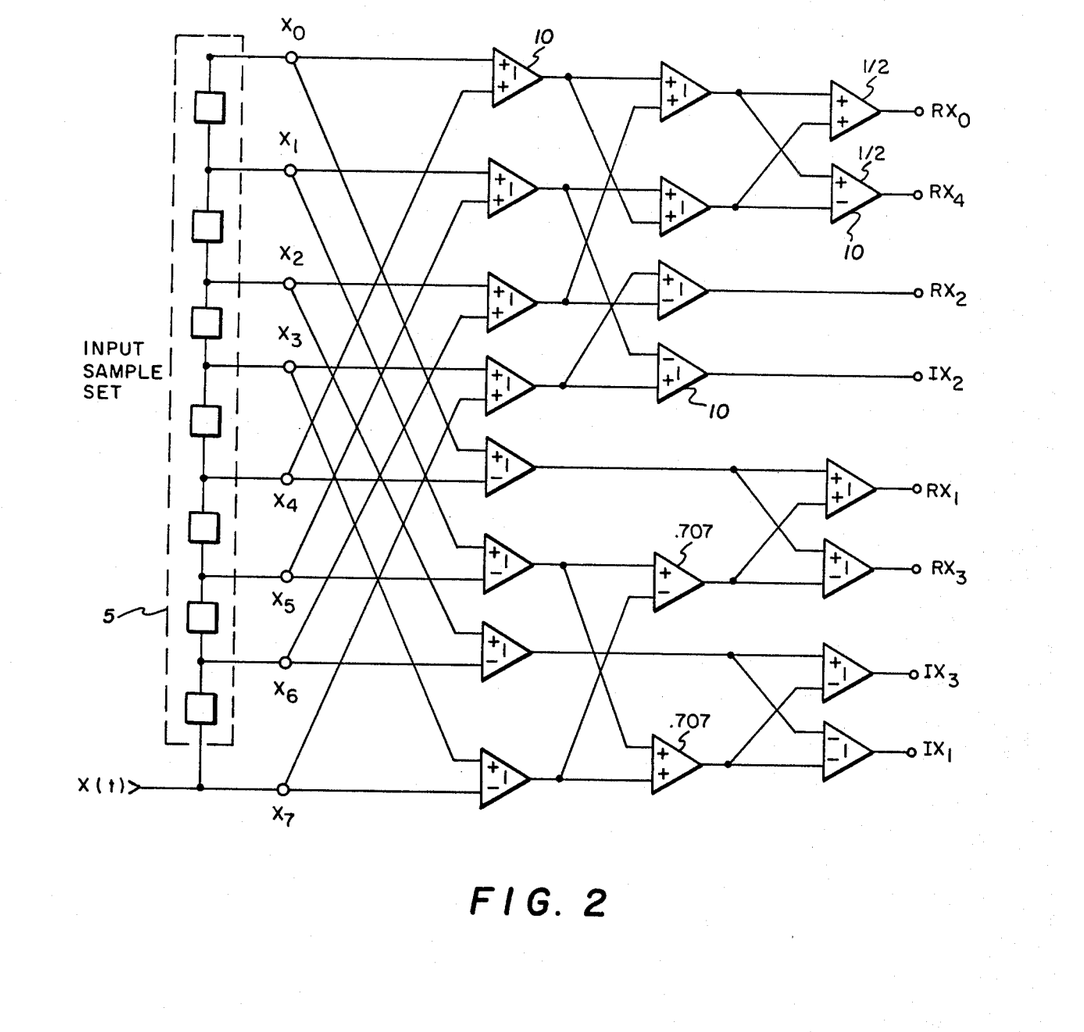
FIG. 2 is an analog circuit for performing the discrete Fourier transform of a sample set.

FIG. 2 shows an analog discrete Fourier transform (ADFT) circuit which produces a set of electrical signals which represent the real and imaginary coefficients respectively of samples of the Fourier transform, i.e., frequency spectrum, of the input signal. The input to the ADFT circuit comprises a discrete sample set of, for example, light samples $x_0, x_1, \ldots x_7$ of the received signal $x(t)$. The sample set may be taken, for example, from terminals of a tapped delay line 5. The discrete $i^{th}$ sample set $[X]_i = x_0(i), x_1(i), \ldots x_7(i)$ is transformed by the ADFT circuit into the frequency domain and represented by vectors $X_n$ which are generally complex. Real and imaginary parts of the vector are designated $RX_n$ and $IX_n$ respectively. Similarly, RH, IH and RD, ID designate the real and imaginary parts of the transfer functions H(w) and D(w), respectively.

FIG. 2 shows a plurality of operational amplifiers 10 having input terminals marked "+" or "−" for indicating the additive or subtractive function performed therein. The gain of the amplifiers is indicated by the multiplication factor shown. All amplifiers have unity gain except those having gain 0.707 or 0.5. The ADFT circuit shown in FIG. 2 receives N samples (N=8) of a real input function $x(t)$. For real time samples of $x(t)$, the frequency components $X_n$ for $n > N/2$ are the complex conjugates of $X_n$ for $n < N/2$. Additionally, $X_0$ and $X_{N/2}$ are real. Consequently, $X_0$ and $X_4$ have real components only. Non-redundant information is obtained using the folded spectral coefficients which comprises vectors $x_0$ and $x_4$ and vectors $X_1$, $X_2$ and $X_3$. The complex vectors $X_1$, $X_2$ and $X_3$ specify six parameters, and the real vectors $X_0$, $X_4$ give two more parameters yielding a total of eight parameters consistent with the number of sample points of $x(t)$. (Alternately, of course, the real values $X_0$, $X_4$ and complex values $X_5$, $X_6$, $X_7$ may be used to form the eight required parameters.) ADFT circuitry is described more generally, for example, in U.S. Pat. No. 3,851,162 to Robert Munoz.

The circuitry arrangement shown in FIG. 2 is not unique and alternate matrix arrangements may be developed. The circuit arrangement of FIG. 2 is derived from an analysis of the vector diagram of the discrete Fourier spectral components. The DFT components may be defined by $$X_n = \sum_{k=0}^{N-1} x_k W^{nk} \tag{1}$$

where, $W = e^{-j2\pi/N}$

Equation (1) may be written in terms of real and imaginary components as follows:

$$RX_0 = A \sum_{k=0}^{N-1} x_k \tag{2}$$

$$RX_{N/2} = A \sum_{k=0}^{N-1} x_k \cos(-\pi k)$$

$$RX_n = B \sum_{k=0}^{N-1} x_k \cos\left(\frac{2\pi kn}{N}\right)$$

$$IX_n = B \sum_{k=0}^{N-1} x_k \sin\left(\frac{-2\pi kn}{N}\right)$$

Assuming that the input time dependent signal $x(t)$ is real, the spectral components may be folded and equation (2) will hold for A = 1, B = 2 inasmuch as the folded coefficient spectrum will double the magnitude of all frequency components except the band edges $X_0$ and $X_{N/2}$.

Figure 3:
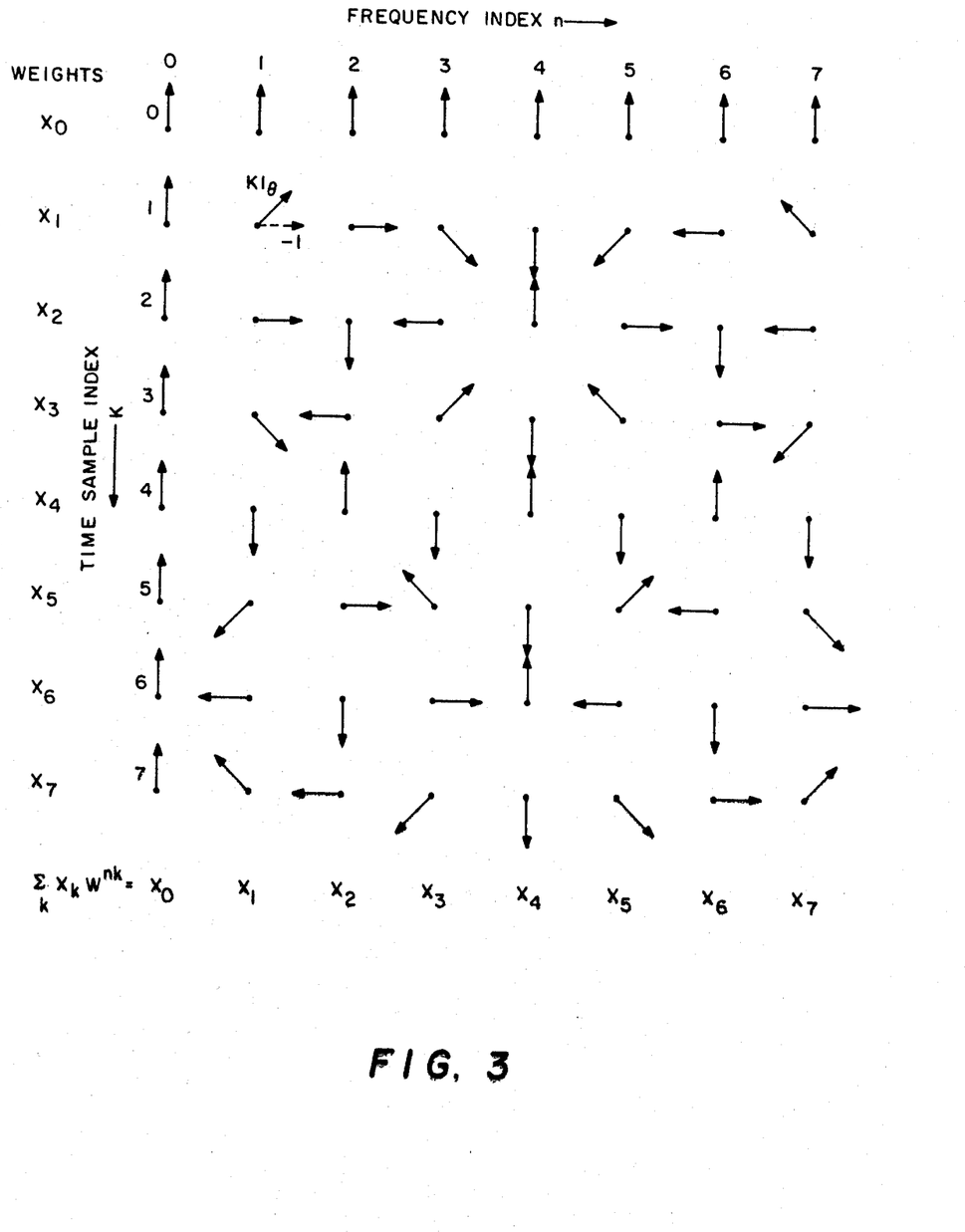
FIG. 3 is a vector diagram of the DFT components for eight sample points.

FIG. 3 illustrates a vector diagram for the general case ($x(t)$ complex) of a N = 8 sample set. The frequency index "n" runs horizontally and the time sample index "k" runs vertically with the older sample taken at the zero time reference, $k = 0$. Each vector represents one term in the summation of equations (1) or (2) for a given value of $n$. The phrase of the vectors is shown by the phase angle, $\theta = -2\,kn/N$, where the vertical direction is taken as the zero phase reference. Thus, vertical components are real ($RX_n$) and horizontal components are imaginary ($IX_n$). The sample weightings are simply the sample values $x_k$ of the time signal $x(t)$ and these samples are used to label each row of the vector diagram to indicate that the magnitude of each vector in the corresponding row has a value $x_k$. For simplicity of illustration, each vector row is shown as having the same magnitude, i.e., $x_2 = x_3$, although in general different magnitudes would be present. The vertical vector sum for each column, $n$, gives the spectral component $X_n$ as indicated in FIG. 3.

Figure 4:
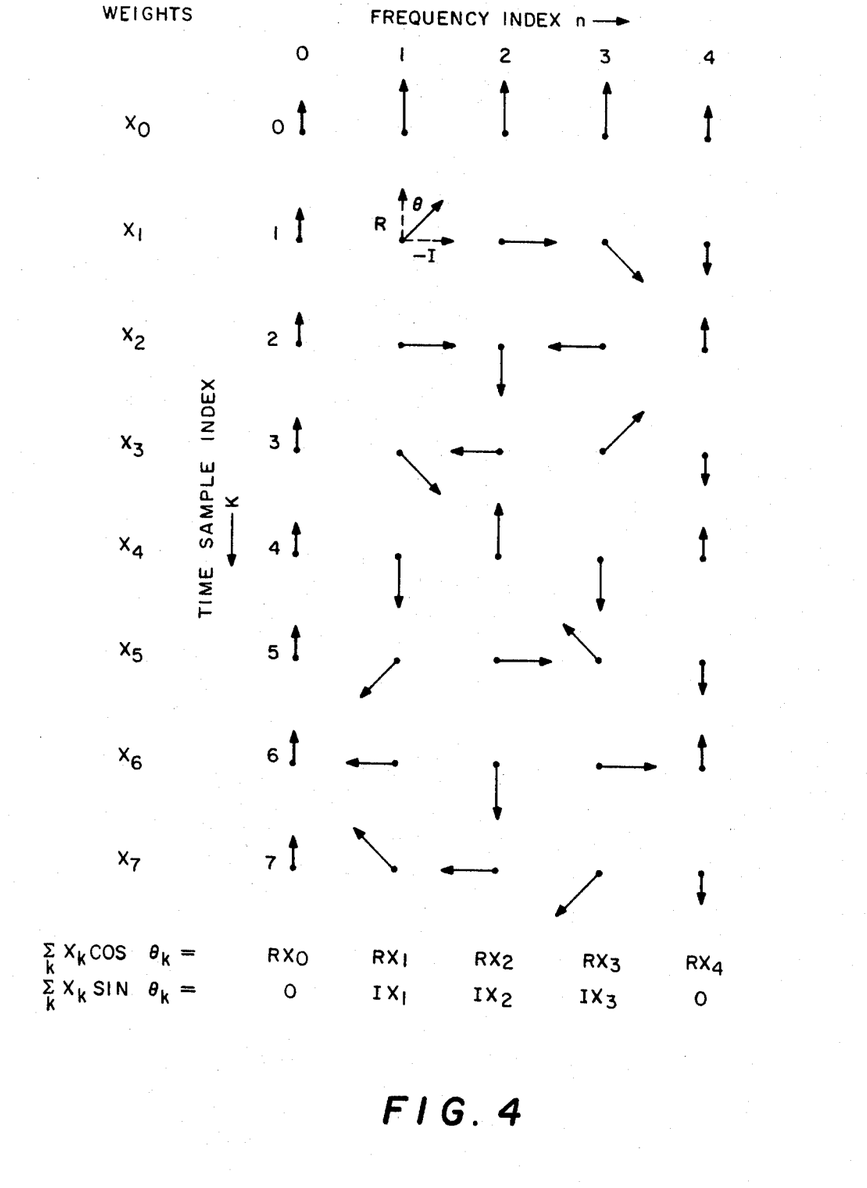
FIG. 4 is a folded vector diagram of the DFT components of FIG. 3.

To produce the folded spectrum of equation (2) with A = 1, B = 2, the conjugates of frequencies $n > 4$ are added to their images in the lower range. This folding doubles the magnitude of all the frequencies except the band edges and results in the single-sided spectrum as shown in FIG. 4. In order to reduce the number of operations required by equation (2) it is desired to operate on the magnitudes of the vectors in FIG. 4 prior to resolving them into their real and imaginary components. The process is outlined in Table 1 below with specific reference to FIG. 5.

TABLE 1

| Stage | Step | Operation | Figure |
|---|---|---|---|
| 1 | A | Add pairwise every fourth sample. | 5A |
|  | B | Subtract pairwise every fourth sample. | 5A |
|  | C | Add pairwise every other result of Step A. | 5B |
|  | D | Subtract pairwise every other result of Step A. | 5B |
| 2 |  | $R_2$ and $I_2$ are produced. |  |
|  | E | Subtract pairwise the odd results of Step B. | 5B |
|  | F | Add pairwise the odd results of Step B. | 5B |
|  | G | Add pairwise the results of Step C. $R_0$ is produced. | 5C |
|  | H | Subtract pairwise the results of Step C. $R_4$ is produced. | 5C |

TABLE 1-continued

| Stage | Step | Operation | Figure |
|---|---|---|---|
| | I | Multiply result of Step E by cos 45°. | 5C |
| | J | Multiply result of Step F by sin 45°. | 5C |
| 3 | | | |
| | K | Add result of Step I to (0-4). $R_1$ is produced. | 5C |
| | L | Subtract result of Step 1 from (0-4) $R_3$ is produced. | 5C |
| | M | Subtract result of Step J from (2-6) $I_3$ is produced. | 5C |
| | N | Subtract result of Step J from negative of (2-6). $I_1$ is produced. | 5C |

For ease of illustration, the sum of two in-phase vectors in FIG. 5 is shown normalized, i.e., the resulting magnitude is divided by 2.

Figure 5A:
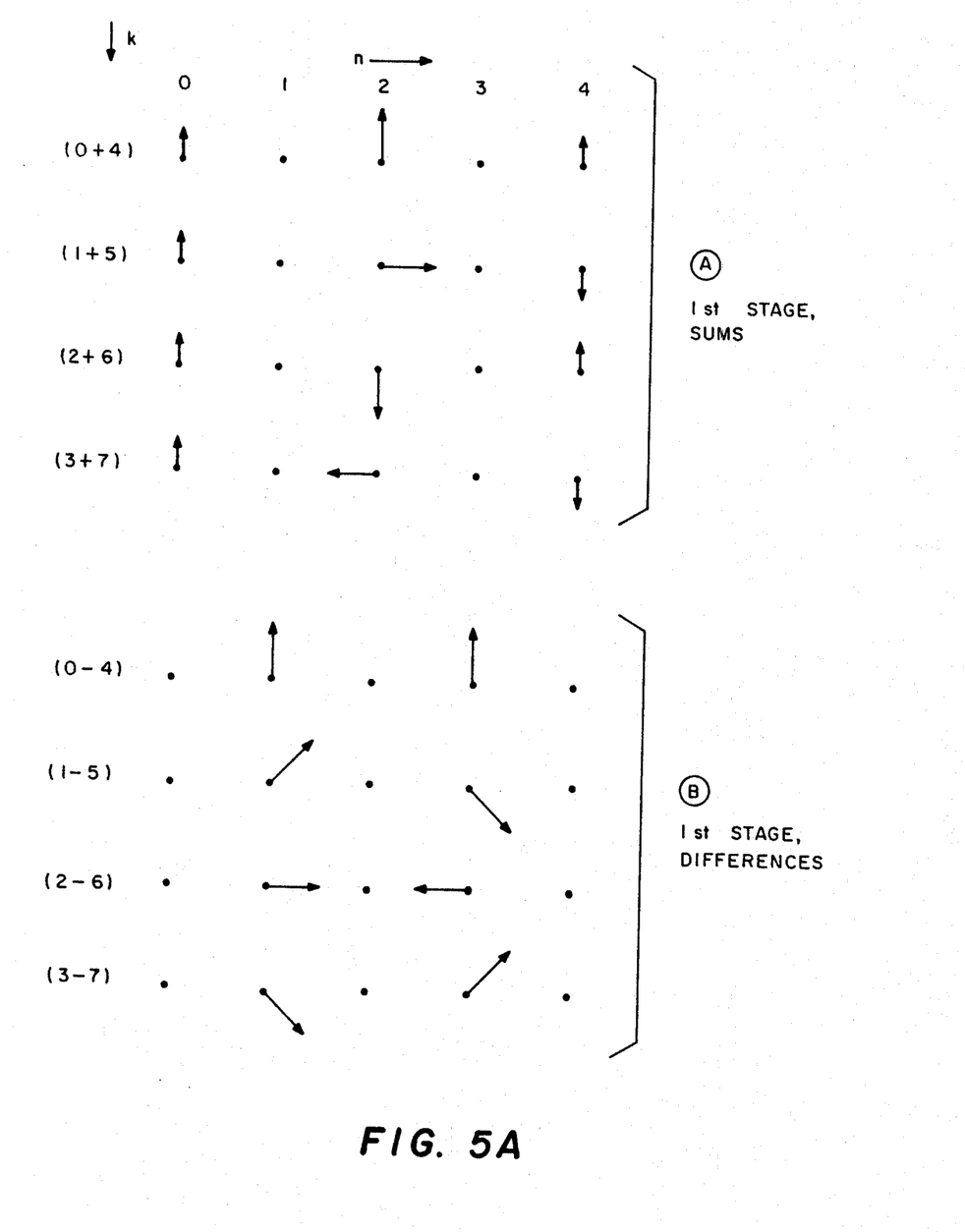
FIGS. 5A–5C are vector diagrams indicating step-by-step operations upon the vectors shown in FIG. 4.
Figure 5B:
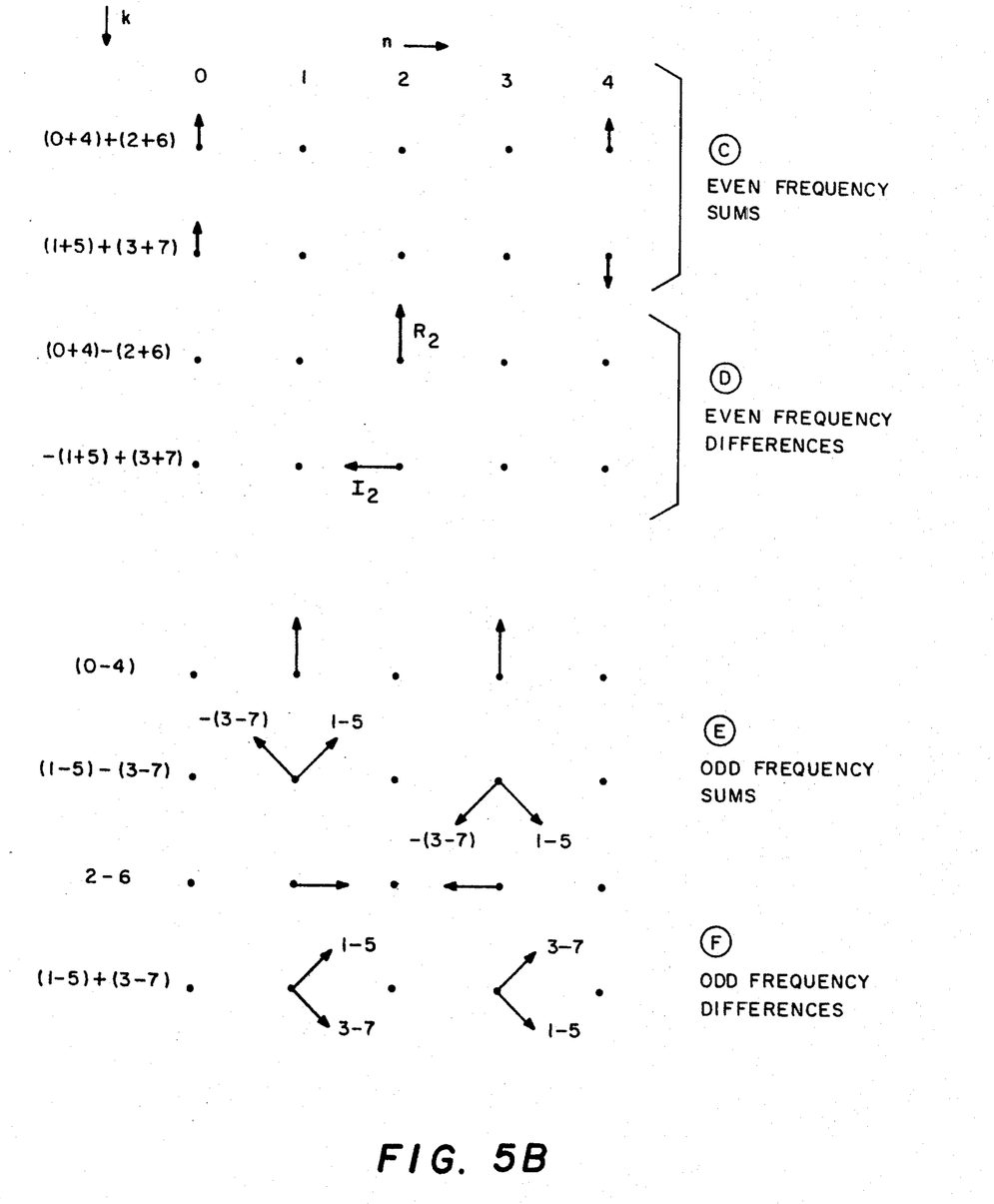
Figure 5C:
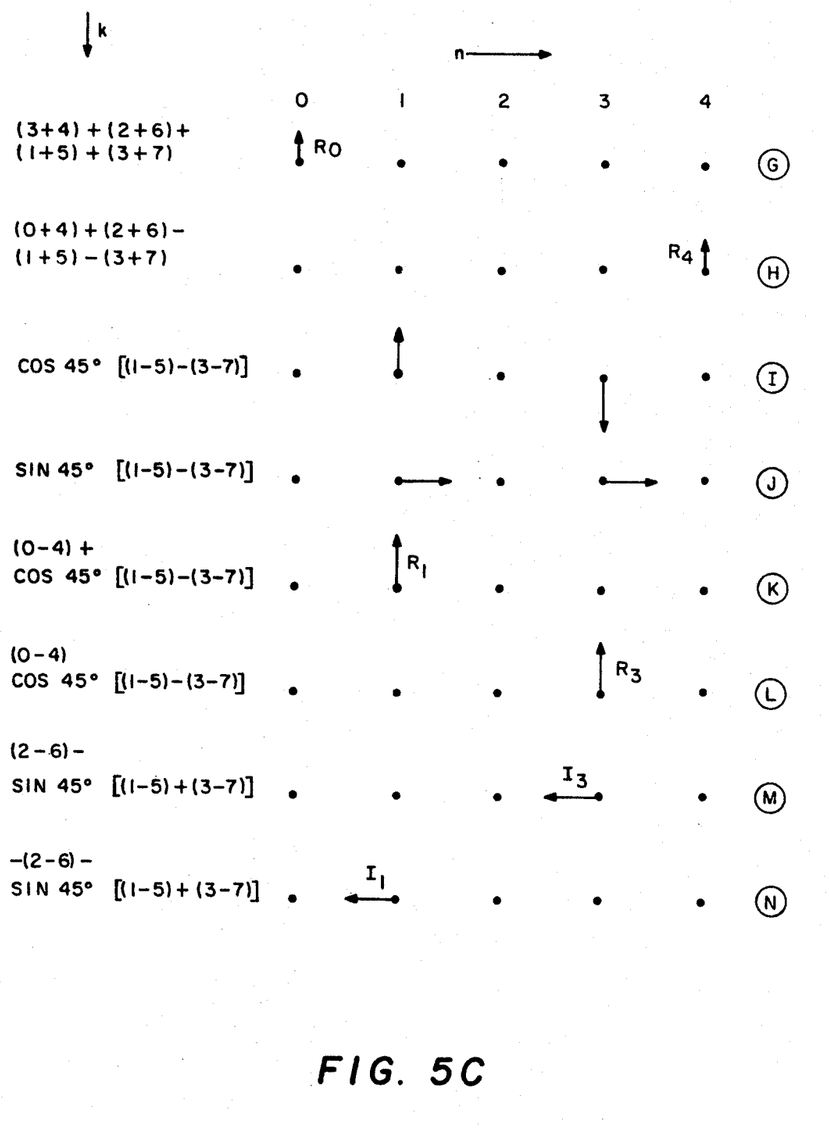
Figure 6:
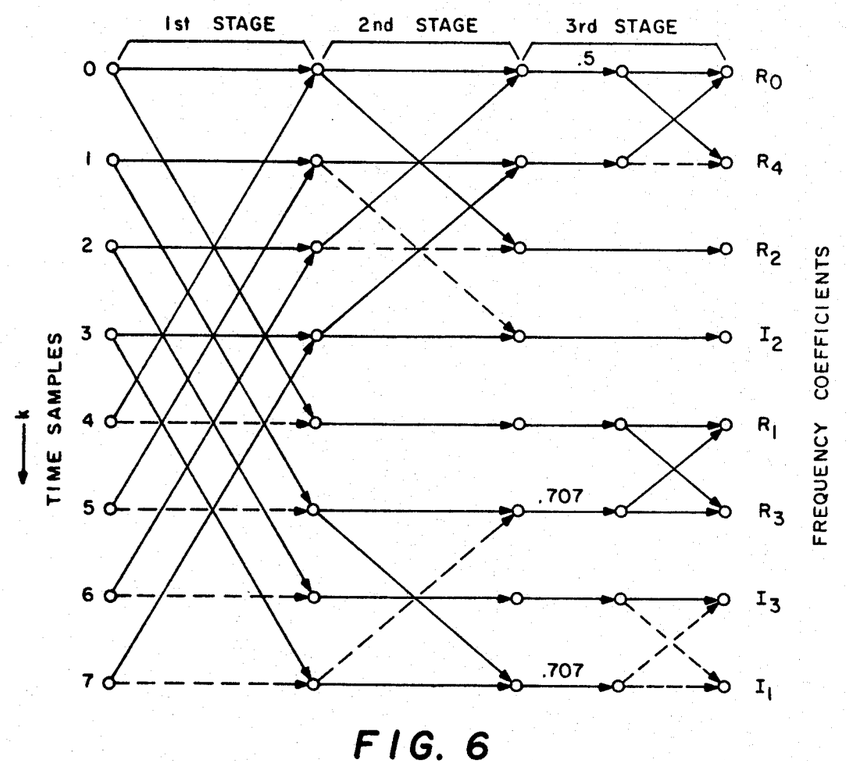
FIG. 6 is a tree diagram summarizing the step-by-step operations of FIGS. 5A–5C.

The operations listed in Table 1 and shown step-by-step in FIGS. 5A-5C are summarized in FIG. 6. In FIG. 6 each node represents a variable and each arrow indicates by its source the variable which contributes to the node at its arrowhead. The contribution is additive. Dotted arrows indicate that the source variable is to be negated before adding, i.e., it is to be subtracted. Change in weighting, i.e., multiplication, is indicated by a constant written close to an arrowhead. For N = 8 only one value is needed for trigonometric weighting since sin 45° = cos 45° = 0.707. It is convenient, however, to multiply $RX_0$ and $RX_4$ by $\frac{1}{2}$ rather than multiply all the other components by 2 as indicated in equation (2). Thus, equation (2) is effectively taken with A = $\frac{1}{2}$ and B = 1. The tree diagram of FIG. 6 is implemented by the circuitry shown in FIG. 2, where operational amplifiers 10 replace the various nodes.

Figure 7A:
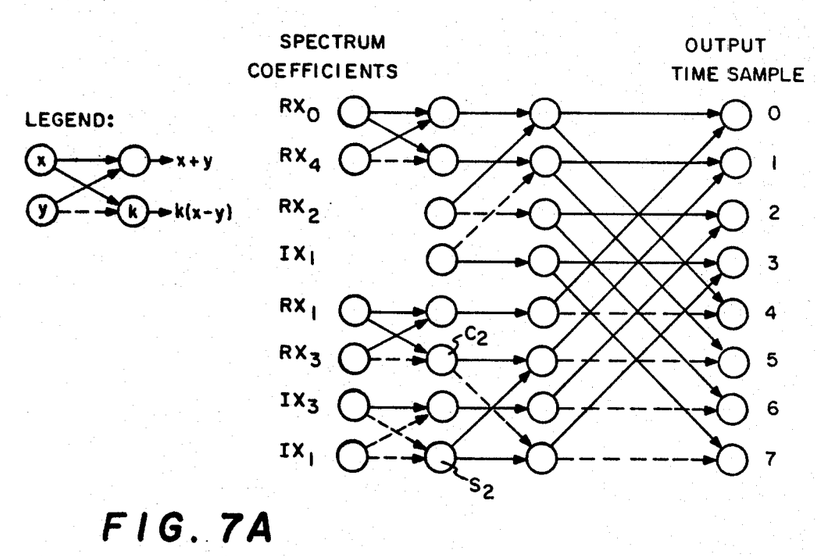
FIG. 7A illustrates a tree graph for the inverse discrete Fourier transform.
Figure 7B:
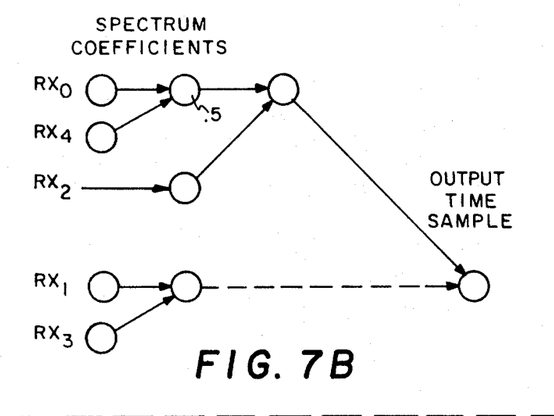
FIG. 7B illustrates a tree graph for the sparse inverse discrete Fourier transform.
Figure 7C:
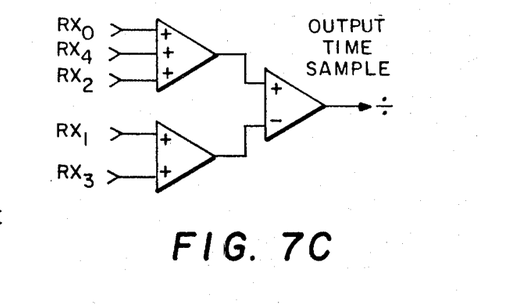
FIG. 7C is an analog implementation of the tree graph algorithm of FIG. 7B.

The inverse of the DFT may be performed quite straight-forwardly by reversing the DFT of FIG. 6. The tree graph for the IDFT is shown in FIG. 7A where the inputs are the real and imaginary spectral components of the non-redundant vectors $X_n$. In the non-overlapping sliding window sampling of the instant invention significant circuit simplicity is provided in using only a single output of the IDFT. The simplest approach is to utilize the inverse transforms which require only real inputs thus eliminating complex multiplication. Accordingly, FIG. 7B shows a "sparse" IDFT for the 4$^{th}$ time sampling, and FIG. 7C shows an analog implementation of FIG. 7B. The output signal at the 4$^{th}$ time sampling is representative of the input signal sample $x_3$, for an input sample set $x_0 \ldots x_{N-1}$. A subsequent input sample set is taken later, shifted in time by a fixed amount $t_0$ where $0 < t_0 \leq T/N$ to provide a sample set $X_0 \ldots X_{N-1}$, and the 4$^{th}$ output sample is again representative of the 4$^{th}$ input time sampling, namely $x_3$. The input sample is again taken, shifted by $t_0$ and the process repeated to provide an overlapping sliding window input. There is therefore a one-to-one correspondence between the numbers of samples from the IDFT and the number of signal sample sets. Thus, the output signal can be continuous if the input is continuous, as for example, in utilizing an analog delay line, or the output can be sampled if the input is sampled, as, for example, in utilizing an input shift register.

Figure 8:
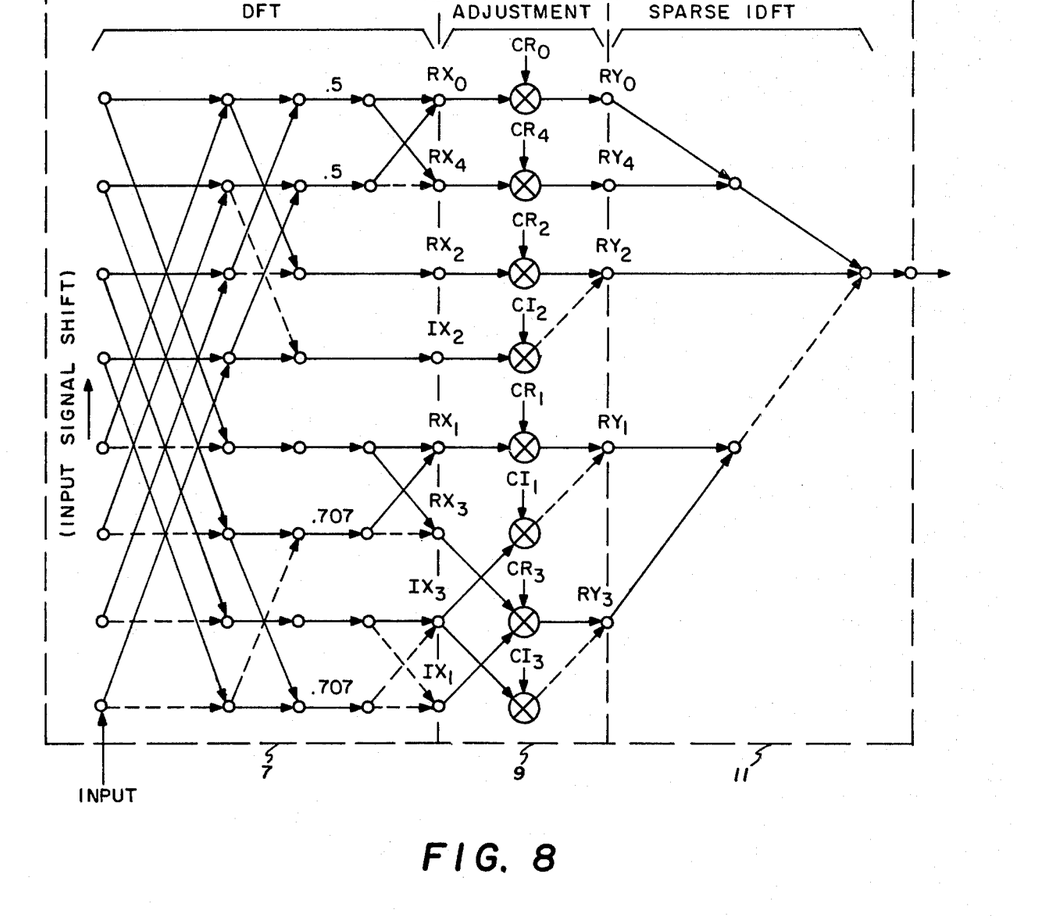
FIG. 8 is a tree graph for the complete equalization.

FIG. 8 illustrates a tree graph for the complete equalization process. The DFT of the input sample set $x_0 \ldots x_{N-1}$ for N = 8 is computed in section 7. The frequency domain equalization is computed in section 9 and the inverse DFT in section 11. As is readily apparent, sections 7 and 11 are identical to FIG. 2 and FIG. 7B respectively. The frequency domain equalization is achieved by multiplying each spectral coefficient $X_n$ by a correction factor $C_n$ which is simply a component of the transfer function of the equalizer C(w). Thus, $$Y_n = X_n \cdot C_n \quad n = 0, 1 \ldots N/2 \quad (3)$$

The equalized spectral coefficients, $Y_n$, are then inverse transformed by the IDFT to provide the time domain representation of the input sample set.

The multiplication in equation (3) is performed component-by-component. Indeed, within the frequency domain the equivalent transfer function of two transfer functions in series is the component-by-component product of the two functions, and there are not cross products as in the case of convolutions. The equalization process of FIG. 8 takes place entirely in the frequency domain and provides an in-line system for automatically equalizing the incoming signals.

It is noted that for an input sample set stored in an input storage means such as a shift register, the samples within a window or sample time frame are designated $x_0 \ldots x_k \ldots x_{N-1}$, and each subsequent sample set is shifted relative to the preceding set. Thus, taking the upper boundary case (where the sample sets are shifted in time by $t_0 = T/N$) as an example, if $[x_k]$ represents the $i-1^{th}$ sample set and $[x_k']$ the $i^{th}$ sample set, one may write, $$x_k' = X_{k+1} \quad k = 0, 1 \ldots N-2$$

$$x_k' = \text{new sample} \quad k = N-1$$

The sample sets overlap and in forming a new sample set, the oldest sample is discarded, intermediate samples shifted, and a new sample taken into the window. This overlapping sampling technique in combination with the sparse inverse DFT is appropriate as opposed to a complete replacement of samples $x_0 \ldots x_{N-1}$ by a non-overlapping sample set $x_n \ldots x_{2N-1}$ inasmuch as multiplication in the frequency domain corresponds to a convolution in the time domain. Normal message transmission involves aperiodic time functions (the message signal x(t) for example) so that one needs the counterpart of an aperiodic convolution of the message signal with the impulse response of the equalizer. The inherent periodicity of the DFT would lead to a periodic or circular convolution if non-overlapping samples were employed.

Figure 9:
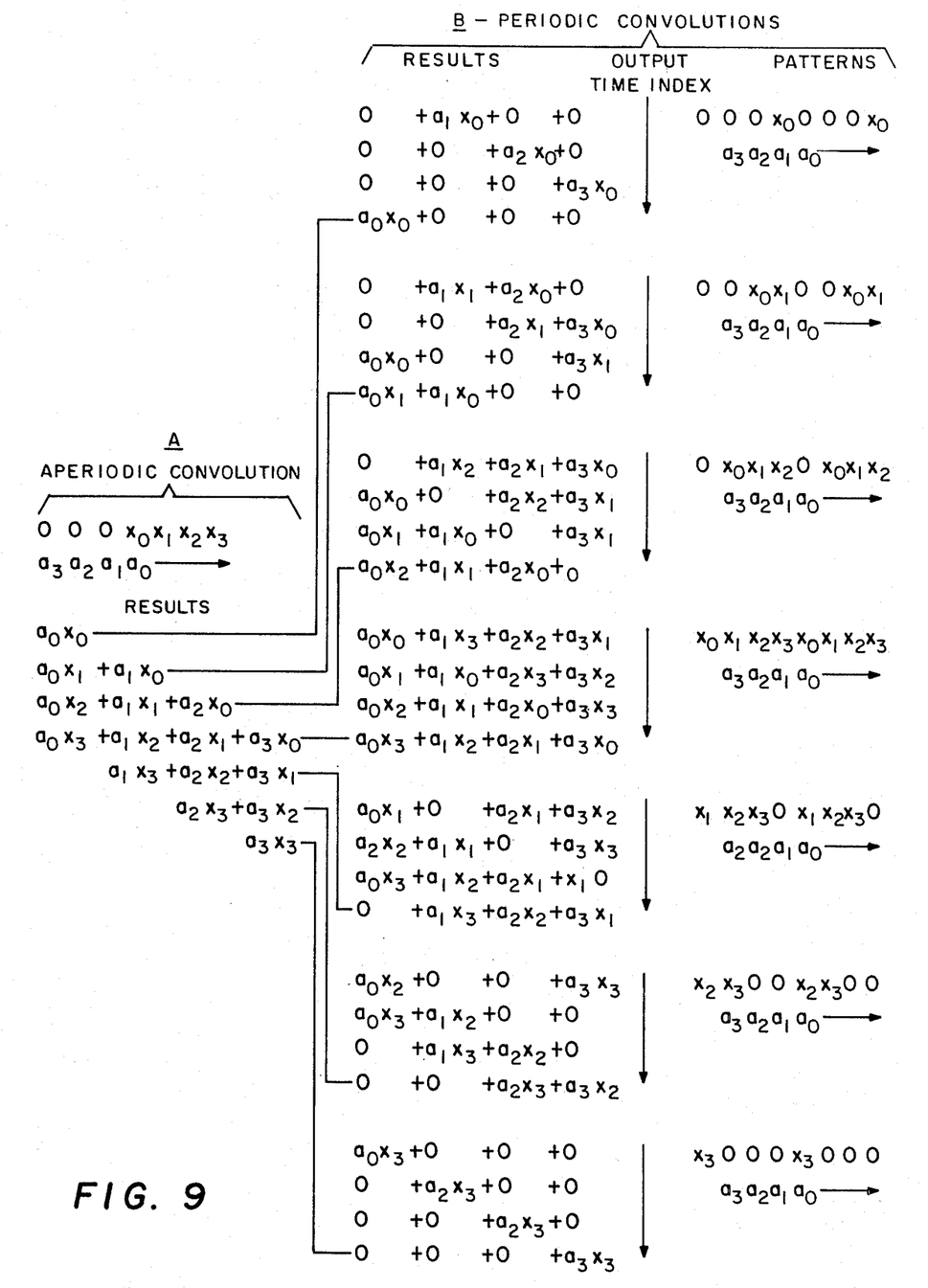
FIG. 9 is an illustration comparing results of an aperiodic convolution with a periodic convolution.

The relationship between the overlapping sampling technique in combination with the sparse IDFT and the aperiodic convolution may be seen by way of the example illustrated in FIG 9, where, for simplicity, N is taken to be 4. The terms $a_0 \ldots a_3$ represent the impulse response of the equalizer in the time domain, and the terms $x_0 \ldots x_3$ represent the samples of the incoming signal x(t). Section A of FIG. 9 represents the desired aperiodic convolution in the time domain whereas section B represents the periodic convolutions resulting from the implied periodicity of the DFT. Section B of FIG. 9 shows the four distinct product summations which result from convolving the first sample set which appears in the sampling window, namely, sample set $x_0$, 0,0,0 shown at the top of FIG. 9 with the impulse response of the equalizer $a_0 \ldots a_3$. In forming the "results" of the convolution, the terms $a_0 \ldots a_3$ are reversed and shifted past the incoming pattern which is shown as periodic, namely, $000x_00000x_0$. The second pattern for the convolution is similarly formed using sample set $00x_0x_1$ which is made periodic as, $00x_0x_100x_0x_1$. The other patterns are similarly produced to represent the various results of a periodic convolution of the incoming sample set as it progresses sequentially through the sampling window which is physically the incoming delay line or input shift register.

The "results" of the aperiodic convolution shown in Section A of FIG. 9 are formed by extending with zeros the incoming sequence $x_0,x_1,x_2,x_3$ so that no periodicity is present, i.e., N-1 zero values are added to the sample set. It is seen that one term of the "results" of the aperiodic convolution is identical with one fixed-time index term of a corresponding "result" of a periodic convolution. Thus, one may utilize the DFT together with its inherent implied periodicity to effectuate the desired aperiodic convolution if one utilizes an overlapping sliding window sampling of the incoming signal in combination with the production of one term of the IDFT. The "sparse" inverse transform is utilized to generate the one time domain output signal as desired.

In general, the number of terms N in the window of the equalizer, i.e., the number of taps on the incoming delay line or the number of stages in the input shift register, need not be equal to the number $N_1$ of sample values of the incoming signal. Let the actual input to the equalizer be $x(i)$, $i = 0, 1, \ldots N_1-1$ where $N_1$ may be greater than N. Let $x(i)$ be extended by at least N-1 zero valued samples (we use N for convenience) to form $x'(i)$, $i = 0, 1, 2 \ldots (N+N_1-1)$. Extending by zeros is equivalent to restricting any repetition of the input signal so that the non-zero response is separated by at least the length of the equalizer.

Referring again to the boundary case $(t_0 = T/N)$ such that the input sampling rate equals the transform sampling rate, if the signal $x'(i)$ is shifted one sample at a time through an N sample equalizer, $N+N_1$ subsets of N samples each are formed according to:

$$x_k(i) = x'(i+k)$$

$$i = 0,1,2, \ldots (N-1)$$
$$k = 0,1,2, \ldots (N+N_1-1)$$

This relationship can also be written $$x'(i) = \frac{1}{N} \sum_{k=0}^{R-1} x_k(i-k)$$

$$i = 0,1,2 \ldots (N-1)$$
$$R = N+N_1$$

Since the discrete Fourier transform is linear $$\sum_{k=0}^{R-1} x_k(i-k) \Longleftrightarrow \sum_{k=0}^{R-1} X_k(n) W_R^{-nk}$$

where $x_k(i) \rightleftarrows X_k(n)$ and $W_R = \exp(2\pi j/R)$. Then $$\sum_{k=0}^{R-1} c'(i)^* x_k(i-k) \Longleftrightarrow \sum_{k=0}^{R-1} C_n X_k(n) W_R^{-nk}$$

where $c(i)$ is the IDFT of the frequency domain correction factors $C_n$, i.e., $c(i) \rightleftarrows C_n$, where "$\rightleftarrows$" represents the DFT/IDFT operation. The left side of this result is a summation of periodic convolutions, but it has already been shown that one element of a periodic convolution is identical to the corresponding element of an aperiodic convolution. By choosing only this single output of the IDFT, the result can be written $$y'(i) = c'(i)^* x'(i) = \sum_{k=0}^{R-1} F_s^{-1} [C_n X_k(n) W_R^{-nk}]$$

where $F_s^{-1}$ indicates a discrete inverse Fourier transform with a single output and $c'(i)$ is $c(i)$ extended with at least $N_1-1$ zero valued sample as implied by an aperiodic convolution. The phase shift factor $W_R^{-nk}$, in the frequency domain indicates that the subsets of the input are taken substantially, i.e., there is a time shift of the output relative to the transform. The factor 1/N is eliminated because only one of the N outputs of the inverse transform is taken.

Thus, in the running mode the equalizer is performing an aperiodic convolution of an input signal of arbitrary length with the impulse response of the equalizer, which is the inverse discrete Fourier transform of the frequency domain correction factors, $C_n$. In practice, the input signal is real so that the negative frequencies associated with the Fourier transform are the complex conjugates of the positive frequencies and do not contain any additional information. Therefore, the discrete Fourier transform is implemented to produce only positive frequencies. Thus, the transformation of N samples results in N real and imaginary coefficients of N/2 positive frequencies, plus dc. The inverse transform is implemented to produce only one output and furthermore it is the one which requires only real coefficients namely the $0^{th}$ or $(N/2)^{th}$ output of the inverse transform.

In order to determine the desired equalizer transfer function $C(w)$, one may assume that an isolated impulse or test signal of known magnitude and polarity is transmitted. This test signal is transmitted during a training period prior to message transmission. In the following description, two test signals are sequentially transmitted to set up or initialize the equalizer to provide the coefficients $C_n$. The ideal received signal is $h(t)$, the impulse response of $H(w)$. However, the actual received test signal is $f(t)$, the impulse response of $F(w) = H(w) \cdot D(w)$. It is intended that $C(w)$ should equal $1/D(w)$ or be the best approximation possible. For the test pulses $f(t)$ one can write the following for each frequency component $n$.

$$F(w) = RF + jIF$$

$$F(w) = (RH + jIH)(RD + jID)$$

$$F(w) = (RHRD - IHID) + j(RHID + RDIH), j = \sqrt{-1}$$

and $$\frac{1}{D(w)} = \frac{H(w)}{F(w)}$$

$$= \frac{RH + jIH}{RF + jIF}$$

$$= \frac{(RH + jIH)(RF - jIF)}{(RF)^2 + (IF)^2}$$

$$= \frac{RHRF + IHIF + j(RFIH - RHIF)}{(RF)^2 + (IF)^2}$$

The ADFT performed at the receiver can produce a set of coefficients for each input sample set $i$ representing RF and IF at discrete frequencies. The coefficients of specific interest for set-up or equalizer training purposes are those which are derived by carrying out the ADFT on the sample set which is found to peak closest in point of time to the peak on the assumed impulse response characteristic $h(t)$, it being understood that the underlying assumption is that a single sample set contains essentially the entire test signal $f(t)$. Of course, since $h(t)$ is known, the coefficients RH and IH can easily be determined for the frequencies of the coefficients selected to represent RF and IF. With this information a sample version of $1/D(w)$ can be produced and used to equalize any signal which is subsequently transmitted through $D(W)$. The equalization function $1/D(w)$ can be written as $1/D(w) = C(w) = RC + jIC$ where $$RC = \frac{RHRF + IHIF}{(RF)^2 + (IF)^2} \quad (4)$$

$$IC = \frac{RFIH - RHIF}{(RF)^2 + (IF)^2}$$

Figure 10A:
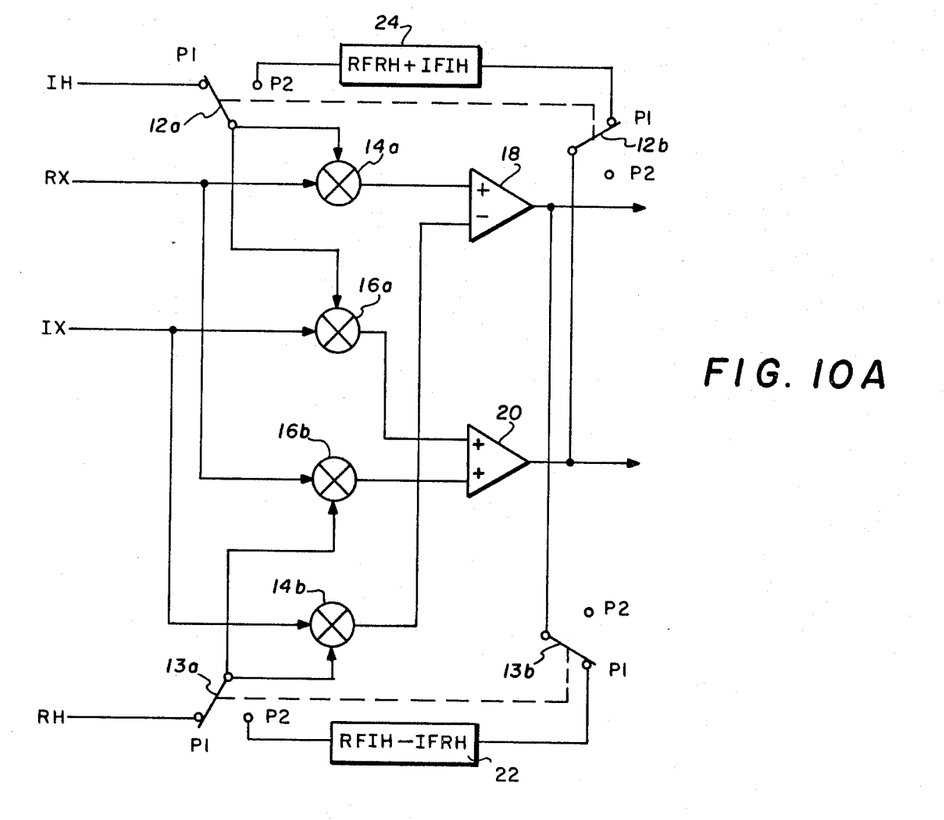
FIG. 10A is a schematic for the complex multiplication and holding circuits used in the invention.
Figures 10B, 11:
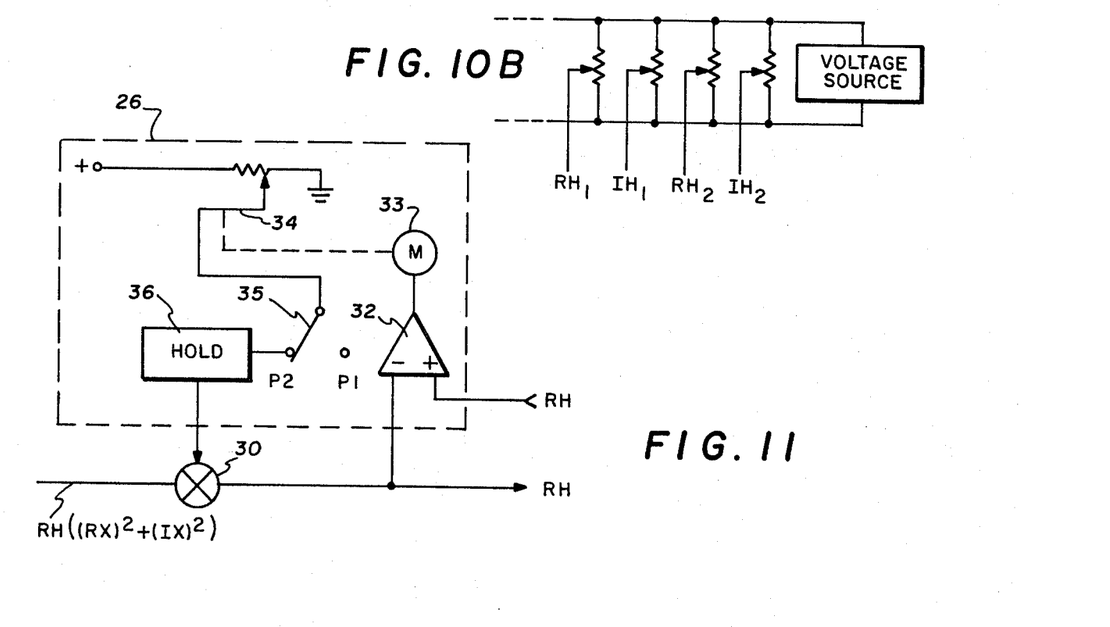
FIG. 10B illustrates a circuit for producing reference voltages used in the invention.
FIG. 11 is a schematic for computing and storing a multiplication parameter used in the invention.

RF and IF for each frequency can be obtained by performing the ADFT on the input test signal as shown in FIG. 2 for an eight frequency discrete spectrum. In order to obtain a result that is not a function of time, $f(t)$ and $h(t)$ must either by synchronized or sampled. If one assumes that samples of $f(t)$, $f_k$ ($k=0 \ldots$ N-1), are used to obtain the RF's and IF's, then the RH's and IH's can be treated as constants. Precise phasing of the sampling is not required but all non-zero samples of $f(t)$ should be included. A shift in the sample phasing merely results in a time shift in the output of the equalization process. The circuitry utilized to implement equations (4) is shown in FIGS. 10A, 10B and 11. A two pass system is utilized in which two ideal or test pulses $h(t)$ are transmitted and received in succession. The pulses are separated sufficiently in time so as to avoid mutual interference, but are sampled at the same relative instance.

The numerators of RC and IC are obtained using the circuit shown in FIG. 10A. The circuit comprises a plurality of switches 12a, 12b, 13a, 13b and a plurality of multipliers 14a, 14b, and 16a, 16b. Operational amplifiers 18 and 20 are shown connected to the multiplier outputs and are used to provide signals to two holding circuits 22 and 24. During pass 1, when the first ideal pulse is received, switches 12 and 13 are placed at position 1, designated P1 in the figures, and constant voltages corresponding to RH, IH are connected to multipliers 14 and 16. The resulting outputs of operational amplifiers 18 and 20 are stored in holding circuits 22 and 24. Holding circuit 22 stores a value corresponding to RFIH − IFRH and holding circuit 24 stores a value corresponding to RFRH + IFIH. During pass 2, the second ideal pulse is received and switches 12 and 13 are placed at position 2, designated P2 in the figures. The values stored in the holding circuits 22 and 24 are then connected to multipliers 14 and 16. The subsequent output of the operational amplifiers 18 and 20 is given respectively by RH((RF)$^2$ + (IF)$^2$) and IH((RF)$^2$ + (IF)$^2$). These values need only be multiplied by the factor $1/((RF)^2 + (IF)^2)$ to obtain the desired equalized frequency domain values of the ideal signal RH and IH.

The constant values for the ideal test signal $h(t)$ may be provided as outputs of potentiometers as shown in FIG. 10B. Only the circuit for $H_1$ and $H_2$ is illustrated in FIG. 10B although any required number of values may be provided.

The multiplying factor $1/((RF)^2 + (IF)^2)$ is obtained during the pass 2 operation of the system taking the output from operational amplifiers 18 and 20 and using the circuitry shown in FIG. 11. FIG. 11 shows a servo and hold circuit 26 and a multiplier 30. The servo and hold circuit 26 comprises an operational amplifier 32, motor 33, and adjustable potentiometer 34, switch 35 and holding circuit 36 all of which are connected in seriatim for connection back to multiplier 30. Potentiometer 34 is controlled in a divider network by motor 33 to provide a controlled voltage through switch 35 and holding circuit 36 to multiplier 30. Inasmuch as the known ideal pulse is again received during pass 2, the output of operational amplifier 32 is forced to the desired multiplication factor using the servo gain control arrangement shown with RH as a reference voltage. This circuit automatically provides the multiplying factor $1/((RF)^2 + (IF)^2)$ which is stored in holding circuit 36.

With RC and IC available any signal subsequently transmitted through the system, i.e., the message signal $x(t)$, can be equalized for the distortion $D(w)$ by again employing the same basic circuit of FIG. 10A having switches 12 and 13, operable at position P2, and the circuitry of FIG. 11 having switch 35 operable at position P1. Holding circuits 22, 24 and 36 store values which correspond, for each frequency, to exact equalization transfer functions. Thus, the incoming message signal $x(t)$ is sampled to produce the samples $x_k$ where $k = 0 \ldots$ N−1. The samples $x_k$ are transformed by a DFT to provide spectral components $X_n$ for $n = 0 \ldots$ N−1. The spectral components are equalized to produce equalized spectral components $Y_n = C_n X_n$, $n = 0 \ldots$ N−1 and the sparse inverse DFT is taken for $Y_n$ to produce a single time domain output sample $y_k$ corresponding to the original input sample $x_k$. Employing non-redundant frequency components for the discrete Fourier transforms, where N is an even integer, simplifies the equalization in that circuitry need only be provided for N/2 spectral components. Thus, the DFT circuitry provides components $X_n$ for $n = 0, 1 \ldots$ N/2 and, similarly the components $C_n$ and $Y_n$ need only be provided for $n = 0, 1 \ldots$ N/2. Sliding window sampling of the input signal $x(t)_i$ wherein samples are taken every $T/N^{th}$ interval along the delay line 5 (FIG. 2), allows utilizing a single output from the IDFT corresponding to each sample set for each window. Consequently, N output signals are provided at the output of the IDFT for each N input sample sets.

Figure 12:
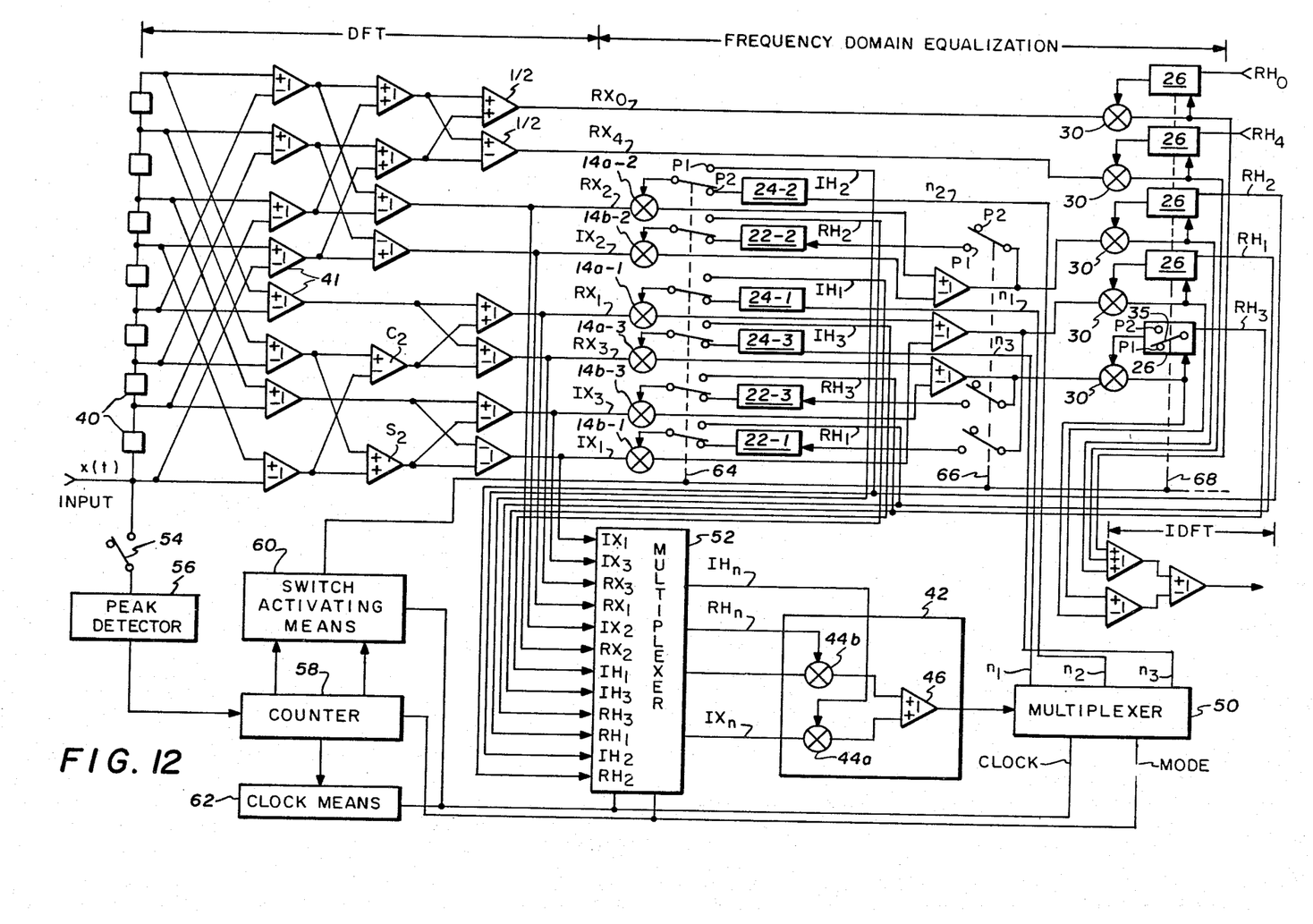
FIG. 12 is an analog implementation of FIG. 8 showing the time sharing circuits of the invention.

The circuitry shown in FIG. 12 represents the analog circuit implementation of the flow diagram of FIG. 8, and incorporates therein the circuits of FIGS. 7C, 10 and 11. Specifically, the input sample data is taken off a delay line 40 and sample sets $i$, $i + 1$... are taken shifted in time relative to one another to provide the sliding window. The DFT, frequency adjustment and sparse inverse DFT are performed for each sample set $i$, $i + 1$ . . . . Operational amplifiers 41 are similar to those shown in FIG. 2, and the output signals corresponding to the discrete frequency components of the transform X are provided as inputs to the equalizer proper. For each real and imaginary pair, $RX_n$, $IX_n$, circuits similar to that shown in FIGS. 10A and 11 are provided. The operational amplifier 20 and the multipliers 16a, 16b of FIG. 10A may be time shared for frequency components $n = 1, 2$ and 3 so that only multipliers 14a, 14b, operational amplifiers 18 and holding circuits 22, 24 need to be separately provided for each frequency channel. FIG. 12 shows a time-shared circuit 42 comprising multipliers 44a, 44b and operational amplifier 46 connected equivalently and corresponding to multipliers 16a, 16b and operational amplifier 20 of FIG. 10A. The output of circuit 42 is fed to a multiplexer 50 for sequential application of the signal values $RX_n RH_n + IX_n IH_n$ to corresponding holding circuits 24-1, 24-2 and 24-3 during a pass 1 operation. These holding circuits correspond to the holding circuit 24 of the single frequency embodiment of FIG. 10A. Similarly, holding circuit 22 of FIG. 10A corresponds to holding circuits 22-1, 22-2 and 22-3 of FIG. 12, and multipliers 14a and 14b of FIG. 10 correspond to multipliers 14a-1 through 14a-3 and 14b-1 through 14b-3 of FIG. 12. A plurality of servo and hold circuits 26 and multipliers 30 are also provided in FIG. 12 to correspond to the apparatus of FIG. 11.

The inputs to time-shared circuit 42 are provided by another multiplexer 52 which provides the appropriate constant reference voltages $IH_n$ and $RH_n$ for $n = 1, 2$ and 3. Signals $RX_n$ and $IX_n$ for $n = 1, 2, 3$ are also fed to the input of multiplexer 52 although, for simplicity, only the signal $IX_1$ is explicitly so illustrated. The multiplexers 50 and 52 are controlled by initializing circuit means comprising set-up switch 54, a peak detector 56, counter 58, switch actuating means 60 and, clock means 62. The counter 58 may be a simple two stage counter serving to actuate the clock means 60 and provide enabling pulses to multiplexers 50 and 52 upon detection of the first of the two test pulses. The clock means 62 provides a clock pulse to the switch actuating means 60 and multiplexers 50 and 52. These clock pulses are typically delayed with respect to the peak of the incoming test signal to allow the test signal to be positioned, for example, near the middle of the delay line 40. Switch actuating means 60 controls sets of switches 64, 66 and 68. Switch set 64 corresponds to switches 12a and 13a in FIG. 10A, which are shown in position P2 for the "run" mode. Switch set 66 corresponds to switch 13b of FIG. 10 and is similarly shown in position P2. Switch set 68 corresponding to switch 35 of FIG. 11, and position P1, is here identical to the "run" position. During pass 1, the first test pulse is received in the equalizer, set-up switch 54 is closed and all switch sets 64, 66 and 68 are set to position P1. During pass 2, the second test pulse is received and all switches are placed in position P2. Subsequently, all switches are set in their run position and set-up switch 54 is open. For switch sets 64 and 66, the run position is identical with position P2 of the switches, whereas for switch set 68, the run position is identical with position P1.

Figure 13A:
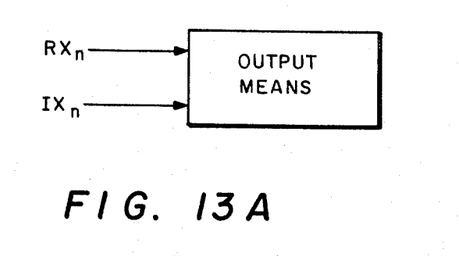
FIG. 13A illustrates a block diagram for providing the DFT coefficients of FIG. 12 to output means.
Figure 13B:
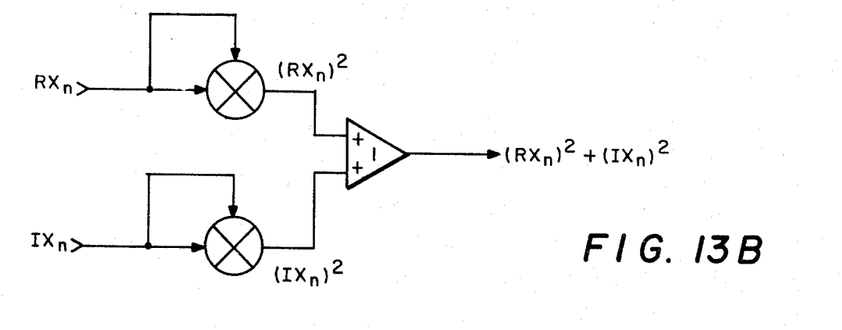
FIG. 13B is a block schematic diagram showing the generation of a power spectrum for the components of the discrete Fourier transformation.
Figure 13C:
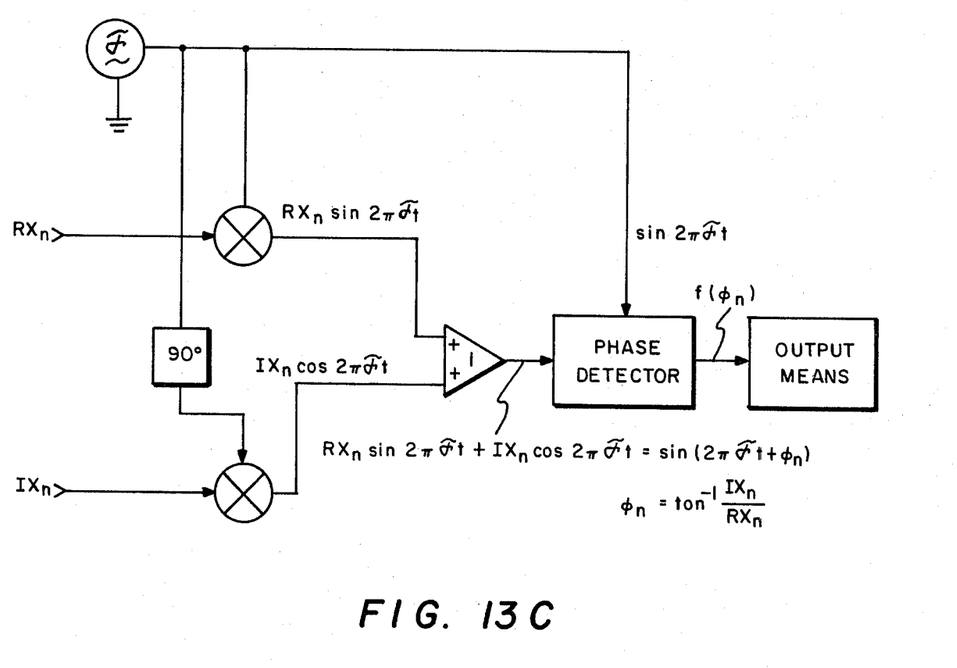
FIG. 13C is a block schematic diagram showing the generation of a phase spectrum for the components of the discrete Fourier transformation.

The DFT coefficients $RX_n$ and $IX_n$ may be fed directly to output means shown in FIG. 13 which may comprise for example an oscilloscope display or appropriate recording or processing means. In such a case, overlapping sliding window sampling enables continuous display, recordation or processing of the spectral coefficients. In addition, the component power spectrum may be generated and provided to output means using the multiplying and summing apparatus of FIG. 13B. Further, the spectral coefficients $RX_n$ and $IX_n$ of FIG. 12 may be fed to a component phase spectrum apparatus as shown by FIG. 13C to provide a phase display, recordation or processing thereof.

The switches utilized in the instant invention may comprise solid state switching devices such as, for example, transistors. In such a case the switch actuating means 60 comprises appropriate driving circuits. Additionally, the two phases of the equalization process could be performed with one set of time samples if they (or their corresponding frequency coefficients) are stored instead of two successive pulses, as discussed above. If the received signals are noisy, the average of a number of received pulses may be used to reduce noise effects. Averaging can be applied either to the time samples or to their corresponding frequency coefficients during the set-up interval (passes 1 and 2). An averaging circuit (not shown), for example a pair of low pass filters, could be time shared between the frequencies.

In a facsimile system the sync pulses used to achieve line synchronization of the scanning and printing mechanisms can provide an ideal set of known pulses for the purpose of setting up the automatic equalizer. Furthermore, if the sync pulses are continued through the transmission of facsimile information the automatic equalizer settings can be regularly updated. The system can thus be adaptive in the sense that the equalizer can be made to track changes in channel characteristics which occur during the transmission of a document.

In utilizing an analog tapped delay line to provide the input sets $x_k$, the equalizer bandwidth is determined by the tap or sample spacing, $\tau = T/N$, and is given by $BW = \frac{1}{2}\tau = N/2T$. In such systems filtering may be used to limit the bandwidth of the incoming sample to BW to avoid aliasing. Images do not occur in an analog delay line since samples are continuously available and the sampling rate may be thought of as infinite. If the input sample set is taken from stages of a shift register, for example, the sampling rate must be at least the Nyquist rate to avoid aliasing. It is important to note that the input sampling rate may not necessarily be the same as the sampling rate seen by the DFT since one could connect, for example, every other stage of the input shift register to the DFT input circuitry. The input sampling rate determines the rate at which the output samples appear and the image locations of the output signal spectrum. The transform sampling rate determines the equalizer transfer function which is continuous in the analog delay line case since the transform sampling frequency, N/T, is twice the bandwidth BW = N/2T. The equalization transfer function may also be made continuous with shift registers or sample and holding circuits at the input if the transform sample interval is taken at T/N seconds using a total of N inputs and if the transform sampling rate, N/T, is selected (consistent with the Nyquist criteria) to be $1/2W_{max}$, where $W_{max}$ is the maximum frequency component of the incoming signal $x(t)$. If the number of samples taken during time T is N, then the equalization will exactly cancel the distortion of N/2 positive frequencies, plus dc, evenly space by 1/T, and the impulse response of the equalized system will be exactly correct at N equally spaced points. This type of equalizer is thus ideally suited to digital transmission; however, the equalization function will be a smooth curve between the sample frequencies so that it is also well suited for non-digital transmission such as facsimile and video. Thus, although control of the equalizer occurs at discrete points, the transfer function itself is continuous from dc to BW = N/2T and beyond, as an image, where T/N is the transform sample spacing. The response in between the control frequencies is a result of the continuous overlapping "windowing" in the time domain.

If the sample set does not include all the non-zero samples of the unequalized system response, the equalization between the sample frequencies will not be good enough to eliminate intersymbol interference in the digital sense. If the samples are not close enough the equalization bandwidth will be too narrow. The equalization function is periodic in the frequency domain with period of $1/\tau$. The sample spacing is easily changed without changing the system complexity. However, if the number of samples is increased the circuit complexity increases faster than linearly, since the number of nodes in the discrete Fourier transform algorithm used is $N \log_2 N$.

While the invention has been described with reference to a particular embodiment thereof it is apparent that modifications and improvements may be made by those of skill in the art without departing from the spirit and scope of the invention.

What is claimed is:

1. Apparatus for providing the discrete Fourier transform (DFT) components of a time dependent signal $x(t)$ comprising:
   (a) means for sampling said signal $x(t)$ to provide a plurality of sets, $i$, of sample values $x_k$, $k = 0, 1 \ldots N-1$, said values $x_k$ corresponding to components of samples of the signal $x(t)$ time displaced by an amount $T/N$ from one another where T is a sample time frame and N is an even integer,
   (b) said sampling means providing the $i^{th}$ sample set time delayed from the $i-1^{th}$ sample set by an amount $t_0$ where $0 < t_0 \leq T/N$, thereby providing an overlapping sliding window sampling of said signal $x(t)$, and
   (c) means for generating the DFT components $X_n$ corresponding to each sample set of values $x_k$ of said plurality of sample sets for $n$ belonging to one of the groups $n = 0, 1 \ldots N/2$ and $n = 0, N/2, N/2 + 1, N/2 + 2, \ldots N-1$.

2. Apparatus as recited in claim 1 further comprising means for displaying said generated DFT components.

3. Apparatus as recited in claim 1 wherein said sampling means comprises an analog delay line having taps spaced an amount $T/N$ from one another, said sample values $x_k$ provided at said taps.

4. Apparatus as recited in claim 3 further comprising means for displaying said generated DFT components.

5. Apparatus as recited in claim 3 further comprising means for generating a power spectrum from said generated DFT components and means for displaying same.

6. Apparatus as recited in claim 3 further comprising means for generating a phase spectrum from said generated DFT components and means for displaying same.

7. Apparatus as recited in claim 1 wherein said sampling means comprises a shift register for storing said $i-1^{th}$ sample set of values $x_k$, said $i^{th}$ sample set of values, $x_k$,' being formed by shifting said values $x_k$ in said shift register such that, $$x_k' = x_{k+1}, \; k = 0, 1 \ldots N-2$$

and where $x_{N-1}'$ is a new sample value of the signal $x(t)$ displaced in time from the sample value $x_{N-2}'$.

8. Apparatus as recited in claim 7 further comprising means for displaying said generated DFT components.

9. Apparatus as recited in claim 7 further comprising means for generating a power spectrum from said generated DFT components and means for displaying same.

10. Apparatus as recited in claim 7 further comprising means for generating a phase spectrum from said generated DFT components and means for displaying same.

11. Apparatus as recited in claim 1 wherein the sampling rate of said sampling means is given by N/T, and said sampling rate is greater than or equal to $1/2W_{max}$, where $W_{max}$ is the maximum frequency component of the signal $x(t)$.

12. A method of providing the discrete Fourier transform (DFT) components of a time dependent signal $x(t)$ comprising the steps of:
    (a) sampling said signal $x(t)$ to provide plurality of sets, $i$, of sample values $x_k$, $k = 0, 1 \ldots N-1$, said values $x_k$ corresponding to samples of $x(t)$ time displaced by an amount $T/N$ from one another where T is a sample time frame and N is an even integer,
    (b) Providing the $i^{th}$ sample set time delayed from the $i-1^{th}$ sample set by an amount $t_0$ where $0 < t_0 \leq T/N$, thereby providing overlapping sliding window sampling of said signal $x(t)$, and
    (c) generating the DFT components corresponding to each sample set of values $x_k$ of said plurality of sample sets for $n$ belonging to one of the groups $n = 0, 1 \ldots N/2$ and $n = 0, N/2, N/2 + 1, N/2 + 2, \ldots N-1$.

13. A method as recited in claim 12 further comprising the step of substantially continuously sampling said signal $x(t)$ to provide sample values $x_k$ spaced an amount $T/N$ from one another.

14. A method as recited in claim 12 further comprising the step of storing said $i-1^{th}$ sample set of values $x_k$ and forming said $i^{th}$ sample set of values, $x_k'$, by shifting said values $x_k$ such that $$x_k' = x_{k+1}, \; k = 0, 1 \ldots N-2$$

and forming said value $x_{N-1}'$ by sampling a new value of said signal $x(t)$ displaced in time by an amount $T/N$ from the sample value $x_{N-2}'$.

15. A method as recited in claim 12 wherein said step of sampling comprises sampling at a rate given by N/T and said sampling rate is greater than or equal to $1/2W_{max}$, wherein $W_{max}$ is the maximum frequency component of said signal $x(t)$.

16. A method as recited in claim 12 further comprising the step of displaying said generated DFT coefficients.

17. A method as recited in claim 12 further comprising the step of generating a power spectrum from said generated DFT components.

18. A method as recited in claim 17 further comprising the step of displaying said generated power spectrum.

19. A method as recited in claim 12 further comprising the step of generating a phase spectrum from said generated DFT components.

20. A method as recited in claim 19 further comprising the step of displaying said generated phase spectrum.

* * * * *